United States Patent [19]
Dory et al.

[11] 3,886,283
[45] May 27, 1975

[54] FUNGICIDAL CARBOXYLIC ACID NITRILES

[75] Inventors: Istvan Dory; Laszlo Feuer; Andras Javor; Gyorgy Matolcsy, all of Budapest, Hungary

[73] Assignee: Chinoin Gyogyszer- es Vegyeszeti Termekek Gyara Rt., Budapest, Hungary

[22] Filed: May 24, 1972

[21] Appl. No.: 256,268

[30] Foreign Application Priority Data
  May 31, 1971  Hungary.............................. CI 1120

[52] U.S. Cl................. 424/304; 71/105; 260/465 F
[51] Int. Cl.².......................................... A01N 9/20
[58] Field of Search...... 424/304; 260/465 F, 465 G

[56] References Cited
UNITED STATES PATENTS

| | | | |
|---|---|---|---|
| 2,695,319 | 11/1954 | Dengel............................ | 260/465 F |
| 2,740,806 | 4/1956 | Rorig.............................. | 260/465 F |
| 2,897,229 | 7/1959 | Stuehmer et al.................. | 424/304 |
| 3,441,617 | 4/1969 | Lloyd.............................. | 260/465 F |

OTHER PUBLICATIONS
Chemical Abstracts, 61: 4280a (1964).

*Primary Examiner*—Albert T. Meyers
*Assistant Examiner*—Leonard Schenkman
*Attorney, Agent, or Firm*—Karl F. Ross; Herbert Dubno

[57] ABSTRACT

Compounds of the formula

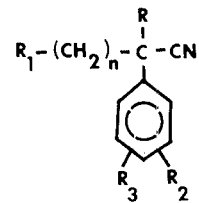

have insecticidal, herbicidal and fungicidal activity and may be combined in an amount of 0.001 to 10 percent by weight with inert, diluent, carrier or biologically active ingredients. In the formula, R is hydrogen or alkyl with 1 to 4 carbon atoms. $R_1$ is hydrogen, methyl or alkoxy with 1 to 4 carbon atoms or substituted phenyl, $R_2$ and $R_3$ are hydrogen, alkoxy or halogen, and n is 0 to 18.

1 Claim, No Drawings

FUNGICIDAL CARBOXYLIC ACID NITRILES

The invention relates to pesticidal compositions, containing α-phenyl-alkane-carboxylic acid nitriles and to the preparation of the active ingredients.

The pesticidal compositions of this invention contain as an active ingredient a compound of the formula I:

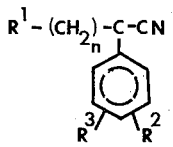

wherein R is hydrogen or alkyl group, containing 1–4 carbon atoms, $R^1$ is hydrogen, a methyl group, an alkoxy group containing 1–4 carbon atoms or an substituted or unsubstituted phenyl group, $R^2$ and $R^3$ are hydrogen, an alkoxy group containing 1–4 carbon atoms or halogen, and n = 0–18. The composition also includes inert, solid or liquid carriers or diluents.

The α-phenyl-alkane carboxylic acid nitrile derivatives of the formula I possess fungicidal, insecticidal and herbicidal effect and can be therefore used with advantage as pesticidal compositions. Some representations of the compounds of the formula I are particularly effective against some fungi of the plants (e.g. for combatting the growth of fungi on the foliage, for seed-dressing or as soil fungicides).

Other compounds of the formula I possess good insecticidal effects while still others are outstanding herbicides. Some members of this group possess simultaneously fungicidal and an insecticidal effects, while some other derivatives show a herbicidal effect as well.

In the formula I. R represents preferably hydrogen, methyl or ethyl.

The $R^1$-$(CH_2)_n$-alkyl group represents preferably a methyl-, ethyl, or cetyl group. $R^1$ may stand for a methoxy or halogen or substituted phenyl group particularly a p-chloro-phenyl group. n stands preferably for 0, 1, 2 or 15.

The substituents of the phenyl ring are preferably attached to the meta or para-position. $R^2$ and $R^3$ stand preferably for a methoxy, or ethoxy group or a chlorine or hydrogen atom.

Particularly advantageous representatives of the compounds of the general formula I. are the following compounds:
α-ethyl-α-phenyl-butyric acid nitrile,
α-(3,4-dimethoxyphenyl)-butyric acid nitrile,
α-(3,4-dimethoxyphenyl)-α-ethyl-butyric acid nitrile,
α-(3,4-dimethoxyphenyl-γ-methoxy-butyric acid nitrile,
α-(3,4-dimethoxyphenyl)-valeric acid nitrile,
α-(p-methoxyphenyl)-butyric acid nitrile,
α-(p-chlorophenyl)-butyric acid nitrile,
α-(3,4-dimethoxy-phenyl)-β-(p-chlorophenyl)-propionic acid nitrile,
α-(p-chlorophenyl)-γ-methoxy-butyric acid nitrile,
α-(p-chlorophenyl)-valeric acid nitrile,
3,4-dimethoxy-benzylcyanide,
3,4-diethoxybenzylcyanide, and
α-(3,4-dimethoxy-phenyl)-stearic acid nitrile.

The active ingredient content of the pesticidal compositions of the present invention may vary within broad ranges and depends on the nature of the pest, the character of the composition and the method of the application. The active ingredient content of the pesticidal composition is usually from about 0.001 to about 10 percent by weight, preferably 0.001 – 5 percent weight. The compositions can be stored in the form of concentrates of a active ingredient, which may be diluted before application to the desired concentration with a suitable diluent. The active ingredient-content of the concentrate amounts generally from about 20 percent to about 60 percent.

The compounds of the formula I are readily soluble in some water-miscible, non-phytotoxic organic solvents (e.g. in alcohols, glycols, glycolmonoethers, formamide and dimethylformamide). By using suitable emulsifiers stable aqueous dispersions can be prepared. Preferred emulsifiers are the fatty alcohol sulfonates.

The compounds of the formula I may be formulated as solid compositions (e.g., grains, dusting powders). Preferred carriers are bentonite, fuller's earth, calcium carbonate, etc.

The active ingredient is preferably formulated as dusting powders, emulsions or suspensions. The dusting powders are prepared by mixing the active component with the powdered diluent. When liquid compositions are prepared, the active ingredient is dissolved in a suitable solvent and/or is dispersed in water. The pesticidal compositions of the present invention may contain if desired, the usual adjuvants (surface-active agents, wetting agents, dispersing agents, binders, coagulants, etc.) and even known biologically active compounds.

The pesticidal compositions of the present invention may have applications in the agriculture and the forestry. The active ingredient or the composition, containing same may enter at the foliage or other parts of the plant. The plants can be protected by applying the compounds of this invention to the soil in which they are growing, or to the seeds by known methods of dusting or spraying.

Most of the active ingredients of the general formula I according to this invention are new, never having been described in the literature. The known compounds of the formula I are these which are prepared from the substituted benzylcyanides in aqueous medium, in ethylene-glycol or in dioxane under basic conditions, in the presence of a catalyst by alkylating same with alkyl halides at 25° – 70°C. (Polish Pat. Specifications Nos. 49.982, 49.022, 49.071, 49.072 and 51.152.) There is no reference in the above mentioned specifications any pesticidal effect of the compounds.

The present invention further relates to a process for the preparation of the compounds of the general formula I, which comprises introducing a R and/or $R^1$—$(CH_2)_n$ group in one or two steps into a compound of the general formula II (wherein $R^2$ and $R^3$ are defined as above):

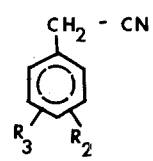

The introduction of the group R and/or $R^1-(CH_2)_n-$ is carried out by alkylating or aralkylating methods, known per se. The alkylation may be conducted with alkyl halides, particularly with chlorides and bromides. The reaction medium may be aqueous or aqueous-organic. When working in an aqueous-organic medium, aqueous dioxane may be used advantageously. The reaction is generally carried out in an alkaline medium, particularly by using alkaline metal hydroxides, most preferably sodium hydroxide or potassium hydroxide in the presence of a catalyst. Preferred catalysts are quaternary ammonium salts, particularly trialkyl-benzyl ammonium halides. A highly preferred catalyst is the triethyl-benzyl-ammoniumchloride. The reaction can be carried out under pressure, if necessary.

The compounds of the formula II, in which $R^1$ stands for an alkoxyalkyl group may be prepared from the suitable nitrile of the formula II, by reacting same with ethylenechlorohydrine methyl ether. The reaction is preferably carried out in a basic medium and in the presence of a catalyst of the above-mentioned type.

The alkylation is generally conducted at a temperature between room temperature and the boiling-point of the reaction mixture, preferably between 50° – 70°C, and if desired under pressure.

Further details of the present invention are illustrated by the following examples, without limiting the scope of the invention to the examples.

EXAMPLE 1

3.8 g of triethyl-benzyl-ammonium chloride (referred to further on a TEBAK catalyst), 160 g of sodium hydroxide, 200 ml of ethylene glycol and 96.8 g of ethyl chloride are added to 117 g of benzyl cyanide in a shaking autoclave. The mixture is shaken under pressure in a temperature of about 60°C for 24 – 30 hours, whereafter it is diluted with water. The crude diethyl-benzylcyanide is separated and fractionated in vacuo. 115 g of α-ethyl-α-phenyl-butyric acid nitrile are obtained as a yellow oil. Bp. 97° – 101° C/3 Hg mm, $n_D^{25} = 1.106$. Yield 66.5 percent.

Preparation of an emulsion: The α-ethyl-α-phenyl-butyric acid nitrile is dissolved in a double amount of ethylene glycol, 10 percent of fatty alcohol sulfonate are added and dispersed with a 50 and 100 times this amount of water. In both cases a stable emulsion is obtained. The preparation tested in vitro shows a fungicidal effect against the following four phytotoxic fungi species: Thielaviopsis basicela, Fusarium oxysperum, Colletetrichum lindomuthicum and Colletetrichum orbiculare.

EXAMPLE 2

342 g of 3,4-dimethoxy-benzyl-cyanide, 172 ml of an 5.0 percent aqueous sodium hydroxide solution, 6.5 g of TEBAK catalyst and 150 g of ethyl bromide are shaked in a shaking autoclave under nitrogen-pressure at a temperature of about 60°C for 30 hours. After the reaction ends, the mixture is diluted with water and the crude α-(3,4-dimethoxy-phenyl)-butyric acid nitrile is separated and fractionated in vacuo. 355 g of the main fraction are obtained. Bp. 157° – 159°C/2 Hg mm, $n_D^{25} = 1.5274$, $d_{25}^{25} - 0.9977$. M.p. 56° – 57°C, Yield 89 percent. Formulation of an emulsion: The α-(3,4-dimethoxy-phenyl)-butyric acid nitrile is dissolved in a 2.5 fold amount of dimethylformamide, 10 percent of Emulsogen-IT are added and dispersed in a 100 fold quantity of water. A stable emulsion is obtained. A fungicidal effect was observed in vitro on 9 species of fungi, especially against Ascochyta pisi, Cl. lindomuthianum. Cl. orbiculare, in vivo against powdery mildew of apples (Pod.leucotricha) in a spray-concentration of 0.2 percent, and against powdery mildew of cereals (Erysiphae graminis) applied in a dose of 2.5 – 3 kg/ha as spray.

An insecticidal effect was observed in vivo by a concentration of 0.2 – 0.4 g/l against sucking parasites e.g. Megoura viciae (green aphid), rodent parasites e.g. Melontha melolontha (may bug) depot parasites e.g. Acanthoscelides obtectus (bean weevil) and against the males of the European corn borer.

As herbicidal agent in a dose of 20 kg/ha applied post emergens the compound was active against doublecotyledonic weeds in monocotyledonic cultures e.g. Trifolium pretense L. (red clover) Linapos alba L. (white mustard), Papaver somniferum (poppy), etc.

EXAMPLE 3

A mixture of 354 g of 3,4-dimethoxy-benzylcyanide, 400 ml of ethylene glycol, 320 g of solid sodium hydroxide, 7.2 g of TEBAK catalyst and 200 g of ethyl chloride is reacted under pressure at 60° – 70°C for 35 hours. The reaction being completed, the mixture is shaken with water, the oily phase is separated and fractionated. 333 g of α-(3,4-dimethoxy-phenyl)-α-ethyl-butyric acid nitrile are obtained. Bp. 145° – 150°C/2 Hg mm, $n_D^{25} = 1.5302$. Yield 71.4 percent.

Formulation of emulsion: The α-(3,4-dimethoxyphenyl)-α-ethyl-butyric acid nitrile is dissolved in a 5 fold amount of ethylene-glycol, 10 percent Emulsogen-IT are added and after having been dispersed in a 100 fold amount of water a stable emulsion is obtained.

A fungicidal effect was in vitro proved against 7 parasital fungi, especially against Ascochyta pisi, Fusarium oxisperum and Colletetrichum orbiculare.

As insecticidal effect was observed in a concentration of 0.11 – 1.0 percent on test-animals as Acanthoscelides obtectus (bean weevil) and Megoura viciae (green-aphid).

EXAMPLE 4

A mixture of 264 g of 3,4-dimethoxy-benzyl cyanide, 134 ml of an 50 percent sodium hydroxide solution, 5 g of TEBAK catalyst and 151 g of ethylenchlorohydrinmethylether is reacted in a shaking autoclave under pressure, at a temperature of about 50°C for 55 – 60 hours, whereafter it is diluted with water. The crude α-(3,4-dimethoxy-phenyl)-α-methoxy-butyric acid nitrile is separated and fractionated in vacuo. 294 g of an oil are obtained. Bp. 150° – 165°C/1-2 Hg mm, $n_D^{15} = 1.5287$. Yield 84 %.

Formulation of an emulsion: The α-(3,4-dimethoxyphenyl)-γ-methoxy-butyric acid nitrile is dissolved in a 5 fold amount of dimethylformamide and dispersed in a 100-times quantity of water, thus a stable emulsion is obtained.

A fungicidal effect was observed in vitro against 8 species of fungi. In vivo the compound proved to be a fungicide with a very good contact-effect against rust disease of broad beans, (Vicia fabae) and garden beans (Phasolus fulgaria) in a dose of 0.5 – 1.0 percent; applied in the form of soil-treatment against powdery mildew of barley (Erysiphaw graminis) in a dose of 0.25 percent. During the investigations a phytotoxical effect was observed only at doses above 1 percent.

EXAMPLE 5

A mixture of 354 g of 3,4-dimethoxy-benzylcyanide, 200 ml of dioxane, 220 ml of 50 percent sodium hydroxide solution, 8.2 g of TEBAK-catalyst and 200 g propyl chloride is shaken under pressure in a shaking autoclave at a temperature of about 60°C for 55–60 hours. After cooling, the mixture is diluted with water and oil is separated. The solvent removed, the residue is fractionated. 204 g of α-(3,4-dimethoxy-phenyl)-valeric acid nitrile distilled off as a yellow oil, which solidifies on standing. M.p.: 67°–70°C, $n_D^{25}$ = 1.5923. Yield 46.6 percent.

Formulation of emulsion: The α-(3,4-dimethoxyphenyl)-valeric acid nitrile is dissolved in a 2.5 fold amount of formamide, or in a 5 fold amount of dimethylformamide and 10 percent of "Estheroil" are added. After diluting with a 100 – 200 fold amount of water a stable emulsion is obtained.

A fungicidal effect was observed in vitro against 16 species of fungi.

In vivo it was effective when applied in the form of soiltreatment against rust of broad beans (Uranomyces viciae fabae) in a concentration of 0.5 – 1.5 percent and against powdery mildew of barley (Erysiphae graminis) in a concentration of 0.25 percent. In contact-treating test it was effective against rust of broad beans and garden beans in a concentration of 0.25 percent and if applied preventively against powdery mildew of barley in a concentration of 0.125 percent. A phytotoxical effect was shown only by contact-application, but only at doses higher than 0.5 percent.

An insecticidal effect was measured and compared to that of Wofatox against bean weevil (Acanthoscelides obtectus) and green vetch aphid (Megoura viciae): a relativ efficacity of 24 percent was found.

A herbicidal effect was found in post emergens application by doublecotyledonics, e.g. red clover (Trifolium pratense L.), white mustard (Sinapis alba L.), poppy (Papaver somniterum L.), by mono-cotyledonic culture in a dose of 10 – 20 kg/ha, but in cases of corn and oats also a phytotoxic effect was observed.

EXAMPLE 6

A mixture of 410 g of 3,4-diethoxy-benzylcyanide, 172 ml of a 50 percent sodium hydroxide solution, 6.5 g of TEBAK-catalyst and 150 g of ethyl chloride is reacted under pressure at a temperature of about 70° for 32 hours in a shaking autoclave. The reaction with finished the mixture is diluted with water and the α-(3,4-diethoxy-phenyl)-butyric acid nitrile is separated and fractionated in vacuo. 359.3 g of a colourless oil are obtained. B.p. 160° – 165°C/1 Hg mm, $n_D^{25}$ = 1.5149. Yield 77 percent.

Formulation of an emulsion: The α-(3,4-diethoxyphenyl)-butyric acid nitrile is dissolved in a 2.5 fold amount of glycol-monomethyl-ether, 10 percent of Emulsogen-IT are added and the mixture is dispersed in a 100 fold amount of water. A stable emulsion is obtained.

Tested as fungicide was found in vitro active against 14 test-fungi. In vivo it was efficient if applied in the form of soiltreatment against powdery mildew of barley (Erysiphae graminis) in a concentration of 0.25 – 1.5 percent, and against rust of broad beans and garden beans (Uromyces appendiculatus) in concentrations of 0.5 percent resp. 1–1.5 percent. In contact-treating test it was active against rust of broad beans in a dose of 0.5 percent.

An insectidial effect was measured and compared to that of Wofatox: against bean weevil (Acanthoscelides obtectus) and green vetch aphid (Megoura viciae) and show an effect of 14 – 18 percent.

EXAMPLE 7

A mixture of 220.5 g of p-methoxy-benzylcyanide, 141 ml of a 50 percent sodium hydroxide solution, 5.3 g of TEBAK-catalyst and 120 g of ethylchloride is reacted in a shaking autoclave under nitrogen-pressure, at a temperature of about 60°C for 30 hours. The reaction having finished the mixture is diluted with water and the crude product is separated. On fractionating in vacuo 165 g of -(p-methoxy-phenyl)-butyric acid nitrile are obtained in the form of a colorless oil. B.p. 130° – 145°C/1-2 Hgmm, $n_D^{25}$ = 1.5185. Yield 63.5 percent.

Formulating of emulsion: The α-(p-methoxyphenyl)-butyric acid nitrile is dissolved in a 5 fold amount of dimethylformamide and 15 percent of fatty alcohol sulfonate are added, the mixture is dispersed in a 100 fold amount of water. A stable emulsion is obtained. The product was tested in vitro and proved to have a very strong fungicidal effect. The test was carried out in a concentration of 0.1 percent and compared to Foltep against 20 test-fungi. Identical, or stronger effect was found against the following fungi: Botrytis cinerea, Ascochita pisi, Thielaviopsis basicela, Fusarium oxisperum, Colletetrichum lindomuthianum, Colletetrichum atramentarium, Colletetrichum orbiculare, Aspergillus ochratius, Trichetheticum roseum, Alternaria solani, Rhizoctania solani, Scleratinia trifoliorum, Scleretinia scleretiorum, Monilia linhartiana, Monilia laxa, Sordaria macrospera.

EXAMPLE 8

A mixture of 303 g of p-chloro-benzylcyanide, 188 ml of a 50 percent sodium hydroxide solution, 7.1 g of TEBAK-catalyst and 150 g of ethylchoride is shaken under pressure, at a temperature of about 60°C for 27 hours in a shaking autoclave. The ethylation being finished the mixture is diluted with water and the crude p-chloro-phenyl-butyric acid nitrile is separated, and fractionaed in vacuo. 325 g of α-(p-chloro-phenyl)-butyric acid nitrile are obtained. B.p. 130° – 140°C/1-2 Hgmm, $n_D^{25}$ = 1.5233. Yield 90.4 percent.

Formulation of emulsion: The α-(p-chloro-phenyl)-butyric acid nitrile is dissolved in a 2.5 fold amount of formamide, 10 percent of Emulsogen-IT are added and the mixture is dispersed in a 100 fold amount of water. A stable emulsion is obtained.

The product was investigated in vitro and show a similar fungicidal effect to the product described in Example 7. At a concentration of 0.1 percent it exhibited the strongest effect against the fungi enumerated in Example 7.

EXAMPLE 9

178 g of 3,4-dimethoxy-benzylcyanide are introduced in an apparatus provided with a stirrer. A mixture of 161 g of p-chlorobenzylchloride, 6.5 g of TEBAK-catalyst and 172 ml of a 50 percent sodium hydroxide solution is added in portions and the reaction mixture kept at a temperature of 65° – 70° for 8 hours while stirring, whereafter it is diluted with 200 ml of water and cooled. The mixture is extracted with 200 ml of benzene and the benzene-solution is chromatographed on an aluminum-oxide column after drying. The crude α-(3,4-dimethoxy-phenyl)-β-(p-chloro-phenyl)-propionic acid nitrile (262.6 g) is recrystalized from 96 percent alcohol. M.p.: 93° – 95°C. B.p. 170° – 180°C/1 Hgmm, $n_D^{45}$ = 1.5412. Yield 84.6 percent.

Formulation a powder-mixture: 1 part by weight of α-(3,4-dimethoxy-phenyl)-β-(p-chloro-phenyl)-propionic acid nitrile, 2.4 parts of Bolus-alba, 0.2 parts of sulfite-base drainage powder and 0.2 parts of fatty alcohol sulfonate are homogenized and passed through a sieve. A powder-mixture having 25 percent of an active ingredient content is obtained.

EXAMPLE 10

A mixture of 227 g p-chloro-benzylcyanide, 134 ml of a 50 percent sodium hydroxide solution, 5 g of TEBAK-catalyst and 151 g of ethylenchlorohydrin-methylether is reacted under pressure at a temperature of about 50°C for 55 – 60 hours in a shaking autoclave. The reaction being finished the mixture is shaken with water, the oily part is separated and distilled fractionally in vacuo. 145 g of α-(p-chloro-phenyl)-β -(methoxy-butyric acid) nitrile are obtained. B.p. 80° – 100°C/1 Hgmm, $n_D^{25}$ = 1.5350. Yield 46 %.

Formulation of an emulsion: The α-(p-chloro-phenyl)-β-methoxy-butyric acid nitrile is dissolved in a 2.5 fold amount of formamide 10 percent of Emulsogen-IT are added and dispersed in a 100 times quantity of water. A stable emulsion is obtained.

EXAMPLE 11

A mixture of 255 g p-chloro-benzylcyanide, 168 ml of dioxane and 185 ml of a 50 percent sodium hydroxide solution is introduced in a shaking autoclave whereupon and 6.9 g of TEBAK-catalyst and 168 g of n-propylchloride are added in portions.

The reaction mixture is heated at 60°C under pressure for 80 hours. The reaction being finished water is added and the oily part is separated. The crude α-(p-chloro-phenyl)-valeric acid nitrile is fractioned in vacuo. 131 g of the product are obtained. B.p. 130° – 160°C/2-4 Hgmm, $n_D^{25}$ = 1.5318. Yield 46.2 percent.

Formulation of emulsion: The α-(p-chloro-phenyl)-valeric acid nitrile is dissolved in a 5 fold amount of dimethylformamide, 10 percent of fatty alcohol sulfonate are added and dispersed in a 100 fold amount of water. A stable aquous emulsion is obtained.

EXAMPLE 12

3,4-dimethoxy-benzylcyanide is prepared by chloromethylating ($CH_2O$ + HCl) veratrole and treating the dimethoxy-benzylchloride thus obtained with sodium cyanide. M.p. 64° – 65°C, after recrystallisation from alcohol. B.p. 171° – 178°C/10 Hgmm.

Formulation of a powder-mixture: 1 part (of weight) of 3,4-dimethoxybenzylcyanide and 2.4 parts of Bolus-alba are ground finely and passed through a sieve. After adding 0.2 parts of Arcapon-T, 0.2 parts of sulfite-base drainage powder and 0.2 parts of fatty alcohol sulfonate the mixture is homogenized and passed through a sieve again. The powder mixture thus obtained has an insecticidal effect: against been weevil (Acanthoscelides obtectus) a 100 percent killing is observed during 24 hours in a closed system. It is efficaceous against cereal moth and codling moth the in a closed system. It is active within 48 hours against males of green vetch aphid and European corn borer.

EXAMPLE 13

3,4-diethoxy-benzylcyanide is prepared according to the process described in Example 12 by using pyrocatechin-diethylether as starting material. M.p. 38°C, (after recrystallization from alcohol).

Formulating of emulsion: The 3,4-diethoxy-benzylcyanide is dissolved in a 5 fold amount of ethylenglycol, 10 percent of Emulsogen-IT are added and the mixtures dispersed in a 100 fold amount of water. A stable emulsion is obtained.

The product was tested in vitro and show a good fungicidal effect against 16 test-fungi. In vivo it is efficaceous by soil-treatment against powdery mildew of barley in a concentration of 1.5 percent and against rust of broad beans and garden beans in a concentration of 1–1.5 percent. Its contact-effect in a concentration of 0.5 – 1.0 percent against rust of broad beans is excellent : in higher concentrations it is phytotoxical.

Tests for insecticidal effect have shown a 30 percent activity in a concentration as compared to the insecticidal agenst "Sevin" against green vetch aphyd (Megours viciae) and bean weevil (Acanthoscelides obtectus).

EXAMPLE 14

A mixture of 180 g 3,4-dimethoxy-benzylcyanide, 6.5 g of TEBAK-catalyst and 180 ml of a 50 percent sodium hydroxide solution is heated under stirring at 60°C and during 6 hours 310 g of cetylbromide are added dropwise. The mixture is stirred for further 10 hours at a temperature of 60° – 70°C, whereafter it is diluted with 180 ml of water and is crystallized by cooling under stirring. The precipitated crystals are filtered by suction, washed with 100 ml and an additional 50 ml of water and covered with 50 ml of methanol. (The sodium bromide content of the aquous mother-liquor shows a conversion of 75 percent.)

After drying is vacuo 353 g of α-(3,4-dimethoxy-phenyl)-stearinic acid nitrile are obtained. After recrystallization from alcohol the m.p. amounts to 58° – 60°C. Yield 88 percent.

What we claim is:

1. A fungicidal composition containing 0.001 to 10% by weight of the compound α-( 3,4-dimethoxyphenyl)-stearic acid nitrile and a carrier therefor.

* * * * *